Jan. 12, 1943.   K. SÜSSELBECK   2,308,249
PROCESS OF REMOVING RESIN AND GUM FORMING MATERIALS
AND SULPHUR FROM LOW BOILING HYDROCARBONS
Filed June 21, 1938   2 Sheets-Sheet 1

K. Süsselbeck
Inventor
By: Glascock Downing & Seebold
Attys.

Patented Jan. 12, 1943

2,308,249

UNITED STATES PATENT OFFICE 2,308,249

PROCESS OF REMOVING RESIN AND GUM FORMING MATERIALS AND SULPHUR FROM LOW BOILING HYDROCARBONS

Karl Süsselbeck, Oberhausen-Sterkrade, Germany; vested in the Alien Property Custodian Application June 21, 1938, Serial No. 215,044
In Germany June 21, 1937

3 Claims. (Cl. 196—27)

In the known processes for purifying crude or raw hydrocarbons, more particularly those used as motor fuels, for example crude benzole or crude benzine, to enable the resin-forming constituents and the sulphur to be removed, the pyridine is removed in the usual manner from the hydrocarbons, which are subsequently neutralised and subjected to repeated washing with sulphuric acid; they are then washed with caustic soda and finally the washed products are distilled. The effect of the treatment with sulphuric acid is to polymerise and condense the substances which tend to form resin to form higher molecular compounds, the products of the polymerisation and condensation being retained in the still. In addition to removing the injurious resins and resin-forming substances present in the hydrocarbons, motor fuels for example, it is not possible, when treating the hydrocarbons with sulphuric acid in this manner, to avoid separating constituents, such as olefines, with valuable motor properties with the washing acid or polymerising them so that they will remain in the residue of the distillation process. The consequent loss is greater, the stronger the sulphuric acid used. Motor benzole, for example, is now purified with sulphuric acid in less concentrated form, with about 50° Bé. (Baumé) for example, instead of the 66° Bé. concentration used before. In this way it is possible by using weak sulphuric acid to reduce to from 4 to 6% the washing losses of a benzole, for example, which, when using strong sulphuric acid with 66° Bé., amounts to from 10 to 12%. Nevertheless, in using weak sulphuric acid the washing loss is still greater than is justified by the quantity of resin-forming substances or resins (gum) contained in the crude benzole or crude benzine, for example. Moreover, in treating the benzole with sulphuric acid, even in weak concentration, sulphur compounds are formed by sulphonation. These compounds are decomposed in the subsequent steam distillation process and are the cause of the presence of sulphur in the purified benzole.

These disadvantages and losses are avoided by the invention, the resins and resin-forming substances and the sulphur only being removed from the raw product and the formation of sulphur compounds in the course of the process being avoided without attacking or removing the components with valuable motor properties by continuously introducing the hydrocarbons, such as benzole or benzine hydrocarbons (aromatic and aliphatic hydrocarbons), after a possible preliminary treatment with diluted $H_2SO_4$ and NaOH, into a column, the bottom part of which is heated to the average distillation temperature of the product by means operating indirectly and with a slight drop in temperature. This gentle distillation of the raw product is carried out continuously in such a manner that the raw product is continuously forced through a preheater, for example, and through the column by means of a pump at a pressure greater than that required by the resistance of the piping. According to the degree of preheating the product is more or less completely vaporised at the inlet of the column owing to the expansion, the vaporising temperature corresponding approximately to the average boiling point of the total product vaporised, as, according to the physical law of partial pressure, the low boiling constituents act as carriers for the high boiling constituents, the boiling points of which have not yet been reached. The product is most suitably preheated by heat exchange with the vapour passing from the distilling column. In this manner a temperature is obtained which is only slightly less than the required vaporisation temperature.

According to the invention the hydrocarbons are continuously distilled in the column with a slight drop in temperature and a large surface of the heating apparatus. This is effected by means of an indirect heating apparatus in the bottom part of the column, where a container with oil or similar heat-distributing means heated internally by steam, hot water, electricity or other means is provided, steam and hot water being led into the oil bath through heating tubes, tube coils for example, which are embedded in the oil bath, sand bath or the like means for distributing the heat. These means also serve the purpose of heat accumulators for compensating fluctuations of the temperature. The hydrocarbons entering the column at the preheating temperature become either vaporous upon expansion or they drop down into the bottom part of the column, where the liquid part of the product collects and is partly vaporised without local superheating, while the higher boiling polymerised and condensed components remain in the bottom part of the column. This residue may be drawn off through a syphon tube or it may be drawn off continuously without being permitted to collect. The sump of the column may by means of the syphon tube be maintained at such a level that the oil-filled heating apparatus is constantly surrounded by liquid and its heating surface does not come into contact with vapour. This is not essential, however.

Now, as the unsaturated substances which may be polymerized and condensed may differ in quantity and nature according to the charging stock, it was found, particularly in regard to hydrocarbons with a large quantity of resin (gum) forming constituents, that polymerisation or condensation is considerably promoted and accelerated, particularly in the case of the aliphatic hydrocarbons, by passing the hydrocarbons, either in the raw state or after preliminary treatment, in the vapour state over bleaching earth, infusorial earth, pumice, charcoal, coke, silica gel, kieselgur, active carbon and similar substances saturated with cresol or its homologues before or during the indirect heating of the column for the hydrocarbons as explained. The said bodies of bleaching earth, infusorial earth and the like may also be used in the unsaturated state, cresol or its homologues being added to the hydrocarbons in small quantities before the treatment. The temperature in the filter and the following distilling column is maintained within such a range that the products of polymerisation or condensation formed are separated either immediately after the filter or with the residue or discharge of the said distilling column. The various constituents of natural or synthetic benzine, cracked benzine, benzole or similar hydrocarbons for example, which are unsaturated or tend to resinify have a number of constituents which must be resinified before the treatment. These constituents are separated by the bleaching earth, which is saturated with cresol or its homologues, during the subsequent or simultaneous heating of the distilling column in accordance with the invention, when the bleaching earth or the like will not have the known function of absorbing the resins or resinous substances formed, but, owing to its saturation with cresol or its homologues, the bleaching earth or equivalent bodies will start the process of polymerisation or condensation.

It is also possible to add the cresol or its homologues in quantities of from 0.05 to 0.8, preferably up to 0.5 percent by weight, directly to the raw product before it is charged into the process and to lead the raw material so charged, after it has been preheated, into the column or previously into a filter vessel filled with pure bleaching earth or equivalent substances. The resinous bodies which will form generally have a high boiling point than the charging stock.

The drawings show examples of how the process according to the invention may be carried out.

The process operates in the following manner, for example. The base-containing raw product is forced by a pump $p_1$ through the known pyridine washers $q$ and the neutraliser $r$ into the separating vessel $s$, whence it is, in accordance with the invention, forced—by another pump $p_2$, if necessary—through a preheater $a$, preferably constructed in the form of a heat exchanger and receiving its heat from the purified product passing from column $b$ into cooler $g$. Owing to the expansion of the product at the inlet of column $b$ part of the product is vaporised, the amount vaporised depending upon the preheating temperature. The vapour rises in the column, the liquid parts run down into the bottom, where they are heated to vaporising temperature indirectly and with a slight drop in temperature by the heating tubes $c$ in the oil-container $d$. The vapour which is distilled off leaves the top of column $b$ at $e$ after having, if necessary, passed through a dephlegmator $f$, which may also be dispensed with, and, after passing through the heat-exchanger $a$ enters the cooler or condenser $g$, in which it is completely condensed, passing into the container $h$. Thence it can be drawn off in the form of purified, saleable product. The residue containing the resins and the sulphur flows either through a syphon-like overflow pipe $i$ at the bottom of the column or directly into the residue receiver $k$. Before the raw product is introduced into column $b$ cresol or its homologues may, if necessary, be added to it in small quantities from a container $l$ by means of a pump not shown.

Figure 3:
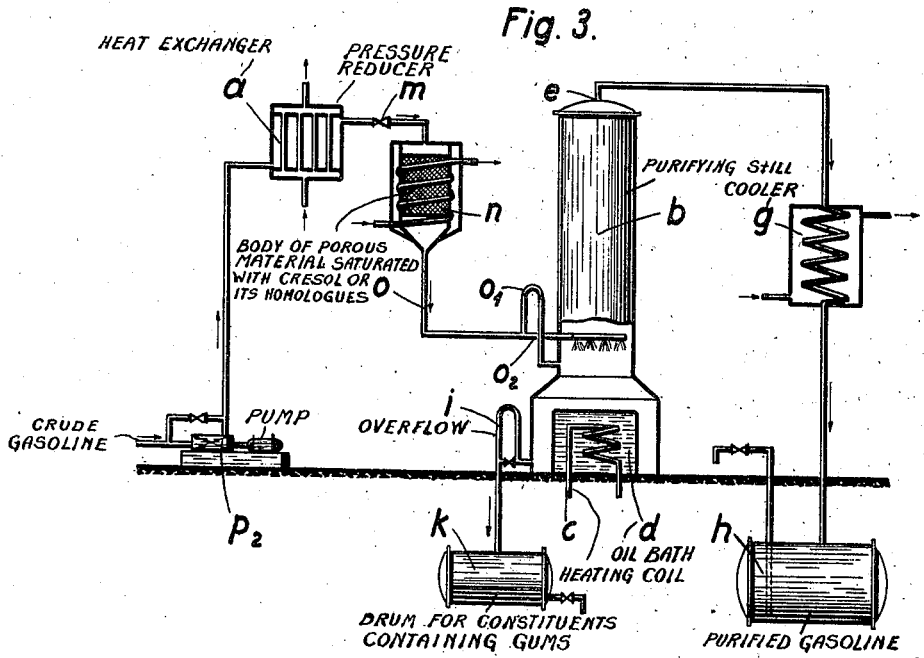
Fig. 3 shows the process with the pre-arranged filter with bodies saturated with cresol or its homologues.

According to Fig. 3 the hydrocarbons pass into the preheater $a$ and through the relief valve $m$ in the pipe-line into the heated filter, which is filled with bleaching earth or the like saturated with cresol or its homologues. From the filter the hydrocarbons pass into pipe-line $o$, in which they are separated into vaporous and liquid hydrocarbons or hydrocarbons which have been liquefied in the filter and are led into column $b$ through pipes $o_1$ and $o_2$ respectively. In column $b$ the indirect heating is effected as explained by means of the apparatus $c$, $d$, the liquid part of the residue being distilled off and passing out of the column at $e$.

Figure 1:
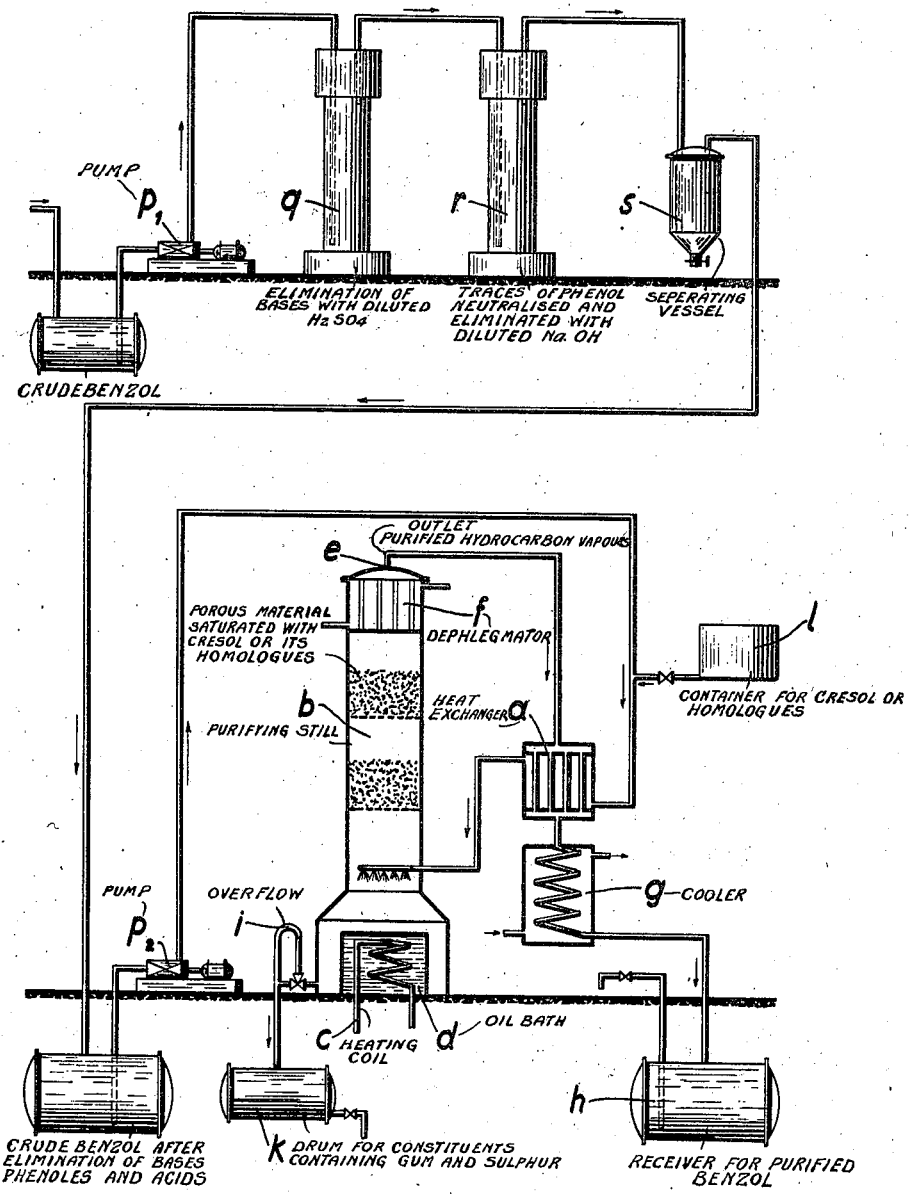
Fig. 1 shows the process according to the invention together with the known processes of pyridine washing and neutralising for benzole.
Figure 2:
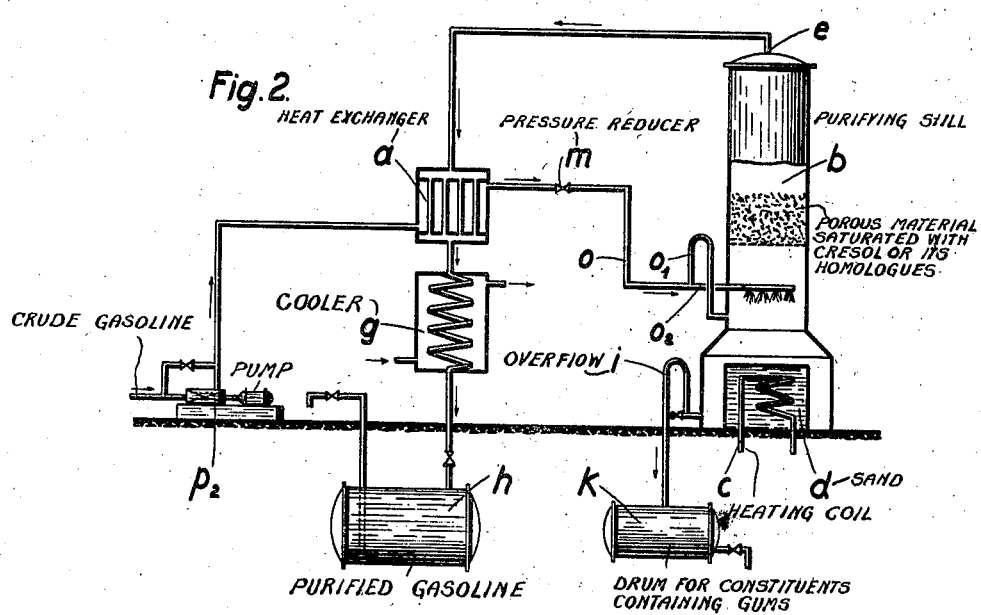
Fig. 2 shows the process as carried out with an indirectly heated distilling column only.

*Example 1.*—After a preliminary purification with a 30% solution of sulphuric acid for the purpose of removing the pyridines and subsequent neutralisation with caustic soda, crude benzole was forced continuously at the rate of 1500 litres per hour by a pump $p_2$ (see Fig. 1) through the preheater $a$ into the column $b$, where it was distilled. The temperatures were 73° C. at the preheater outlet, 96° C. in the oil bath and 92° C. in the vapor space above the indirect heater. The characteristics of the crude benzole, of the distillation product and of the residue discharging from the bottom of the column were as follows:

| | Raw product | Distillation product | Residue |
|---|---|---|---|
| Spec. gravity at 15° C | 0.878 | 0.878 | 0.904 |
| Initial boiling pt. °C | 80 | 80 | 100 |
| Boiling analysis: | | | |
| up to 100° C ___percent by vol__ | 88 | 88 | |
| up to 106° C _____do____ | | 90 | |
| up to 108° C _____do____ | 90 | | |
| up to 120° C _____do____ | | | |
| up to 145° C _____do____ | | | 25 |
| up to 148° C _____do____ | | 95 | 45 |
| up to 160° C _____do____ | 95 | | |
| up to 180° C _____do____ | | | 76 |
| up to 200° C _____do____ | | | 87 |
| Content of a-sulphur, mgs. per 100 cu. cm | 20 | 0 | 92 |
| Test for resin-forming constituents, mgs. per 100 cu. cm | 50 | 1.6 | 250 |
| | | | 800 |

From these characteristics it will be seen that the injurious constituents are completely separated with the residue which collects in the residue receiver $k$ when the raw product is distilled according to the invention.

*Example 2.*—At the rate of 1200 litres per hour and at a pressure greater than that rendered necessary by the resistance of the piping synthetic cracked benzine is forced by the pump continuously through the preheater $a$, (see Fig. 3) in which it is heated to an average temperature of 125° C. for example, whereupon the benzine is led in the expanded state into a vessel $n$ filled with bleaching earth saturated with cresol and maintained at a temperature of about 120° C. The vapour passes through the bleaching earth filter in a downward direction and is led into the following distilling column $b$, the bottom part of which is provided with an apparatus for heating the liquid residue with a slight drop in temperature according to the invention. The high boiling product of condensation already formed in the filter also discharges into the distilling column $b$. The temperature in the vapour space of the column above the heater is about 130° C. while that of the heating oil bath is maintained at about 135–140° C. The characteristics of the raw cracked benzine, of the distillation product and of the residue discharging from the bottom part of the column were as follows:

|  | Raw cracked benzine | Purified product of distillation | Residue in the column |
|---|---|---|---|
| Density at 15° C | 0.708 | 0.707 | 0.770 |
| Boiling analysis according to Engler |  |  |  |
| beginning at °C | 37 | 41 | 104 |
| up to 50° C ___percent by vol__ | 6 |  |  |
| up to 100° C _____do____ | 52 | 51 |  |
| up to 150° C _____do____ | 84 | 83 | 7.5 |
| up to 200° C _____do____ |  |  | 80 |
| 96% by vol. pass over at °C | 174 | 173 | 314 |
| Characteristic figure | 106 | 106 |  |
| Blow-off test mgs. per 100 cu. cm | 22 | 1.2 | 14,000 |

The yield of purified benzine amounted to 98.5 percent of the raw benzine.

The superiority of the invention to the usual processes consists in the abolition of the otherwise necessary washing means, such as concentrated and diluted sulphuric acid, the high yield of utilisable benzole and benzine hydrocarbons, the simplicity of the technical apparatus, the slight washing losses and the ease with which the process is carried out.

Having now particularly described and ascertained the nature of my said invention and in what manner the same is to be performed, I declare that what I claim is:

1. A process of removing resin- and gum-forming materials and sulfur from low-boiling hydrocarbons of the nature of motor fuels which comprises preheating such hydrocarbons under a slight gauge pressure, passing the preheated hydrocarbons into a distilling zone under sufficient release of pressure to at least partially vaporize said hydrocarbons, contacting the hydrocarbons with a small amount of a cresol in said distilling zone, passing the resulting vapors through a porous material and then out of the distilling zone, collecting the residues formed in the process in a pool in the bottom of the distilling zone and heating said pool of residues indirectly to a temperature only slightly above the distillation temperature of said hydrocarbons, and withdrawing said residues from said pool.

2. A process of removing resin- and gum-forming materials and sulfur from low-boiling hydrocarbons of the nature of motor fuels, which comprises preheating the hydrocarbons under a slight gauge pressure, passing the preheated hydrocarbons into a distilling zone under sufficient release of pressure to at least partially vaporize said hydrocarbons, treating the hydrocarbons with a small amount of a cresol in said distilling zone, passing said hydrocarbons through a porous material prior to removal from said distilling zone, collecting the residues from the distillation in a pool at the bottom of said distilling zone, heating said pool to a temperature only slightly above the boiling point of the hydrocarbons and withdrawing said residues from said pool.

3. A process of removing resin- and gum-forming materials and sulfur from low-boiling hydrocarbons of the nature of motor fuels which comprises preheating such hydrocarbons under a slight gauge pressure, distilling the hydrocarbons by indirect heating in a distilling zone, said indirect heating being effected by a bath heated internally, the distilled vapors being used to preheat the hydrocarbons, a quantity not substantially exceeding 1% by weight of a cresol being added to the hydrocarbon prior to the distillation step.

KARL SÜSSELBECK.